US011938086B2

(12) United States Patent
Lauterbach

(10) Patent No.: US 11,938,086 B2
(45) Date of Patent: Mar. 26, 2024

(54) RELEASABLE LOCKING SYSTEM FOR VERTICAL PANELS

(71) Applicant: Ralph Lauterbach, Glen Ellyn, IL (US)

(72) Inventor: Ralph Lauterbach, Glen Ellyn, IL (US)

( * ) Notice: Subject to any disclaimer, the term of this patent is extended or adjusted under 35 U.S.C. 154(b) by 241 days.

(21) Appl. No.: 17/707,035

(22) Filed: Mar. 29, 2022

(65) Prior Publication Data

US 2022/0313549 A1 Oct. 6, 2022

Related U.S. Application Data

(60) Provisional application No. 63/167,687, filed on Mar. 30, 2021.

(51) Int. Cl.

*A61H 33/00* (2006.01)
*E04F 13/08* (2006.01)
*E04H 4/14* (2006.01)
*E04H 4/00* (2006.01)

(52) U.S. Cl.

CPC ..... *A61H 33/6005* (2013.01); *E04F 13/0803* (2013.01); *E04F 13/0826* (2013.01); *E04F 13/083* (2013.01); *E04H 4/14* (2013.01); *A61H 2201/0107* (2013.01); *E04H 4/0037* (2013.01)

(58) Field of Classification Search

CPC ........ A61H 33/6005; A61H 2201/0107; E04H 4/14; E04H 4/0037; E04F 13/083; E04F 13/081; E04F 13/0816; E04F 13/0803; E04F 13/0805; E04F 13/0826

USPC .... 52/510, 506.06, 235, 483.1, 489.1, 489.2

See application file for complete search history.

(56) References Cited

U.S. PATENT DOCUMENTS 3,266,209 A * 8/1966 Jules .......................... E04B 2/76 52/489.1
3,319,983 A * 5/1967 Jules .......................... E04B 2/58 52/489.1
3,453,795 A * 7/1969 Heirich ............... E04F 13/0805 52/506.08
3,553,915 A * 1/1971 Passovoy ................ E04B 2/789 52/489.1
4,976,083 A * 12/1990 Menchetti ............... E04B 2/763 52/489.1
5,058,354 A * 10/1991 Menchetti ............... E04B 2/763 52/489.1
5,058,355 A * 10/1991 Menchetti ............... E04B 2/763 52/489.1
5,107,651 A * 4/1992 Menchetti ............... E04B 2/763 52/489.1
5,564,137 A 10/1996 Watkins et al.

(Continued)

*Primary Examiner* — Brent W Herring

(74) *Attorney, Agent, or Firm* — Wendy W. Koba

(57) ABSTRACT

A releasable locking mechanism for attaching a vertical panel to a support member comprises a first component attached to the back of the panel and a second component attached to the top of the support member. The first component includes an engagement tab that projects outward from the rear surface of the panel. The second component includes a tensioned lever arm comprising a locking edge that may be positioned over the engagement tab and hold it in place. An opposing tail of the lever arm may be moved by an individual, which then rotates the locking edge away from engagement tab and allows the panel to lifted away from the support structure.

7 Claims, 10 Drawing Sheets

(56) References Cited

U.S. PATENT DOCUMENTS

| | | | | |
|---|---|---|---|---|
| 5,644,878 | A * | 7/1997 | Wehrmann ............ | E04B 2/7863 52/287.1 |
| 6,647,562 | B1 | 11/2003 | Arout et al. | |
| 7,562,509 | B2 * | 7/2009 | Ness ..................... | E04F 13/081 52/235 |
| 8,438,794 | B2 * | 5/2013 | Eickhof ................ | E04H 13/006 52/510 |
| 8,782,969 | B2 * | 7/2014 | Eickhof ................ | E04H 13/006 52/510 |
| 9,469,999 | B1 * | 10/2016 | Aboukhalil ......... | E04F 13/0816 |
| 9,743,808 | B2 | 8/2017 | Dragovic et al. | |
| 9,750,376 | B2 | 9/2017 | Dragovic et al. | |
| 10,253,507 | B1 * | 4/2019 | Bilge .................. | E04F 13/0807 |
| 10,260,240 | B1 * | 4/2019 | Bilge .................. | E04F 13/0807 |
| 10,407,917 | B1 * | 9/2019 | Bilge .................. | E04F 13/0816 |
| 2002/0017066 | A1 * | 2/2002 | Marshall .............. | A47B 83/001 52/220.8 |
| 2007/0033728 | A1 | 2/2007 | Sisk | |
| 2008/0010922 | A1 * | 1/2008 | Wagner ............... | E04F 13/0812 52/235 |
| 2009/0211011 | A1 | 8/2009 | Walker et al. | |
| 2009/0260150 | A1 | 10/2009 | Dragovich et al. | |
| 2010/0263314 | A1 * | 10/2010 | Macdonald ............. | E04F 13/12 52/506.05 |
| 2012/0055102 | A1 * | 3/2012 | Fradera Pellicer ... | E04B 1/4121 52/302.1 |
| 2012/0186170 | A1 * | 7/2012 | Macdonald ........... | E04F 13/083 52/173.3 |
| 2013/0117925 | A1 | 5/2013 | Torres et al. | |
| 2013/0205698 | A1 * | 8/2013 | Todd ......................... | E04B 2/88 52/302.1 |
| 2017/0079877 | A1 | 3/2017 | Clark et al. | |
| 2018/0243165 | A1 | 8/2018 | Koops et al. | |

* cited by examiner

RELEASABLE LOCKING SYSTEM FOR VERTICAL PANELS

CROSS-REFERENCE TO RELATED APPLICATIONS

This application claims the benefit of U.S. Provisional Application No. 63/167,687, filed Mar. 30, 2021 and herein incorporated by reference.

TECHNICAL FIELD

The present invention relates to the installation of vertical panels (such as on tub surrounds) and, more particularly, to a releasable locking mechanism for attaching the panels to a support structure that remains "invisible" in the final product.

BACKGROUND OF THE INVENTION

Typical spa tubs are constructed from a fiberglass or plastic shell forming the spa tub basin, which is supported on a surrounding cabinet. The cabinet is typically constructed as a wooden frame of common 2×4 and/or 2×2 lumber, or the like. Decorative panels and finishes are assembled on the frame to define the final look of the cabinet supporting the tub.

To date, these decorative panels are typically attached to the wooden frame using common fasteners/screws. While this type of attachment is relatively quick and inexpensive, the screw heads remain visible and take away from the finished look of the tub. Moreover, the rigid attachment of the panels to the wood frame does not allow for the panels to expand/contract with temperature changes, which may be problematic with a spa tub that is located on an outdoor patio or deck.

Inasmuch as the panels need to be removable so that future repairs may be performed on either the enclosed electrical or plumbing systems (in the United States, a UL requirement is that the panels may easily be removed with a simple tool), the option to permanently bond the panels in place (or use a surround other than separate panels) is not an option.

SUMMARY OF THE INVENTION

The needs remaining in the art are addressed by the present invention, which relates to a releasable locking mechanism for attaching panels to a support structure, where the mechanism itself remains "invisible" in the final product.

In accordance with the principles of the present invention, the releasable locking mechanism comprises two separate components, a first component that is attached to the back-side of a panel or corner area (thus hidden from view) and a second component that is attached to the top of a support structure (such as a frame member). The first component includes a tab that fits over a channel formed in the second component. A tensioned lever arm is included in the second component and used to hold the tab "locked" in place. A horizontal aperture is formed through the thickness of the support structure in the region of the lever arm. The aperture is accessible from the exterior of the panel and allows for an individual to insert a simple tool that moves the lever arm so as to rotate the second component away from the first component and allow for the panel to be dis-engaged from the support structure. The panel can be easily re-positioned by merely re-engaging the tab with the channel.

An exemplary embodiment of the present invention takes the form of a releasable locking mechanism for holding a vertical panel in place along a structural framing member. The locking mechanism is formed of two major components, a first component attached to the panel and a second component attached to the support member. In particular, the first component includes an engagement tab that projects outward from the rear surface of the panel. The second component includes a tensioned lever arm comprising a locking edge for positioning over the engagement tab and an opposing tail, wherein movement of the tail imparts a rotational movement of the locking edge to control the position of the locking edge with respect to the engagement tab and thereby control the engagement and disengagement of the first component with respect to the second component.

Other and further aspects and embodiments of the present invention will become apparent during the course of the following discussion and by reference to the accompanying drawings.

BRIEF DESCRIPTION OF THE DRAWINGS

Referring now to the drawings, where like numerals represent like parts in several views:

FIG. 10 shows the arrangement in an initial position where a panel is being held in place to a support member;

FIG. 11 shows the introduction of a tool, that is moved through an aperture formed in the support member, to contact the tail portion of the lever arm;

FIG. 12 shows a further movement of the tool through the support member, pushing the lever arm to the rear and pivoting the locking member away from the engagement tab;

FIG. 13 shows the removal of the panel from the support member by lifting the freed engagement tab away from the stand-off portion of the second component; and FIG. 14 shows the second component in the following disengaged ("rest") position, with the tool removed and the tail portion of the lever arm returning to its original position.

DETAILED DESCRIPTION

Figure 1:
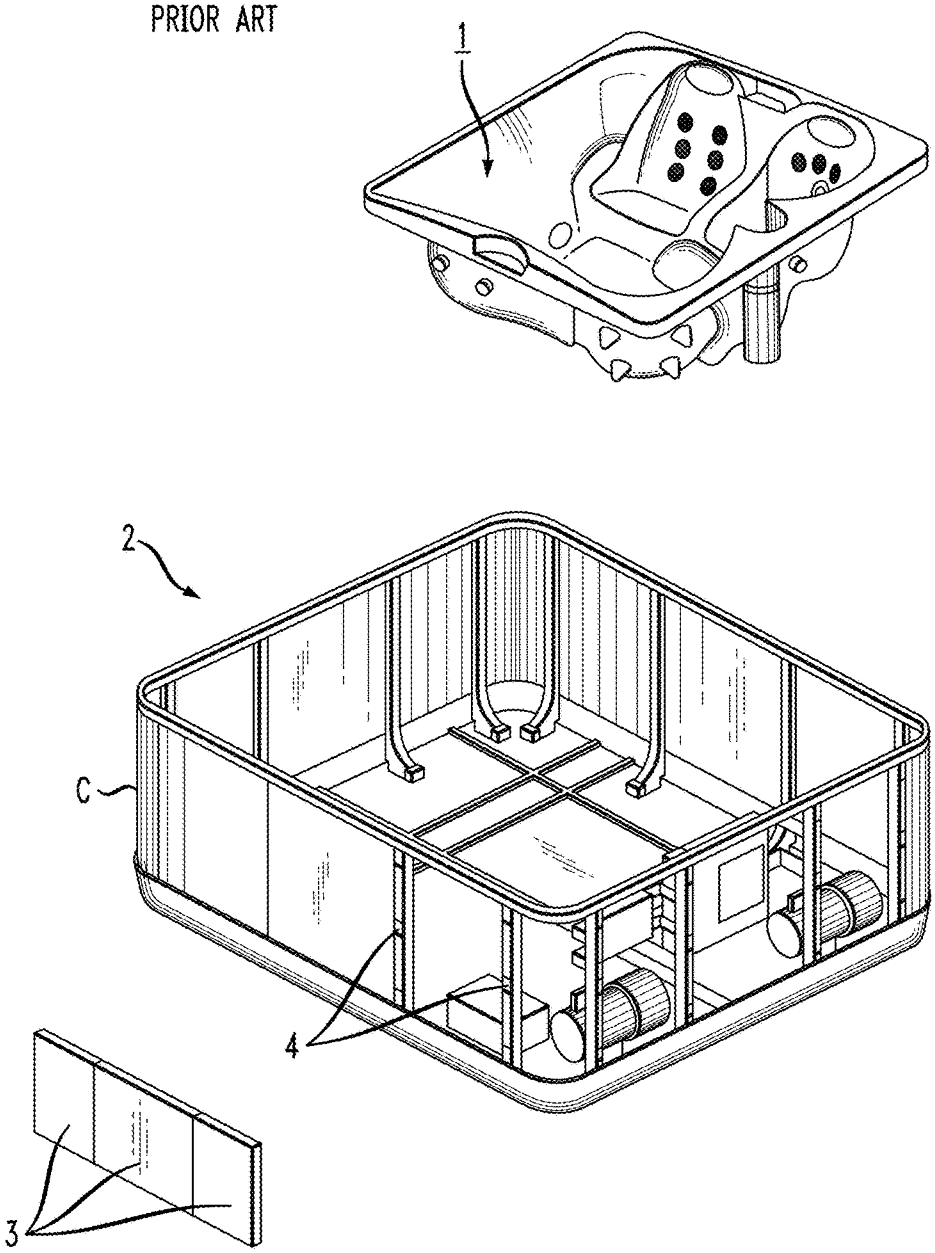
FIG. 1 PRIOR ART
FIG. 1 is an exploded view of a conventional prior art spa enclosure, illustrating a typical removable panel and the associated support structure.

As a context for a discussion of the features of the inventive locking mechanism, FIG. 1 illustrates an exploded view of a typical spa tub, illustrating a spa shell 1, a support structure 2, and a plurality of removable panels 3 that are positioned in place around the sides of support structure 2 to finalize construction of the spa tub. Support structure 2 is shown as including spaced-apart vertical frame posts 4, where as mentioned above panels 3 are typically attached to frame posts 4 using screws so as to allow for individual panels to be removed to perform work on the internal electrical or plumbing systems 5.

Figure 2:
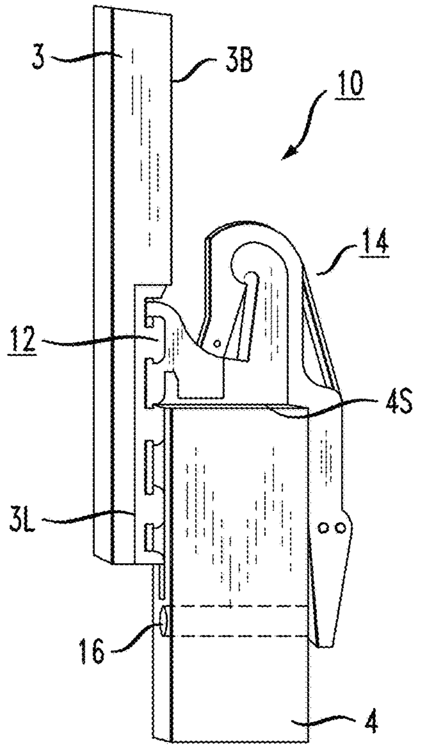
FIG. 2 is a side view of an exemplary releasable locking mechanism of the present invention, shown in its "locked" position of holding a panel in place with respect to its support member.
Figure 3:
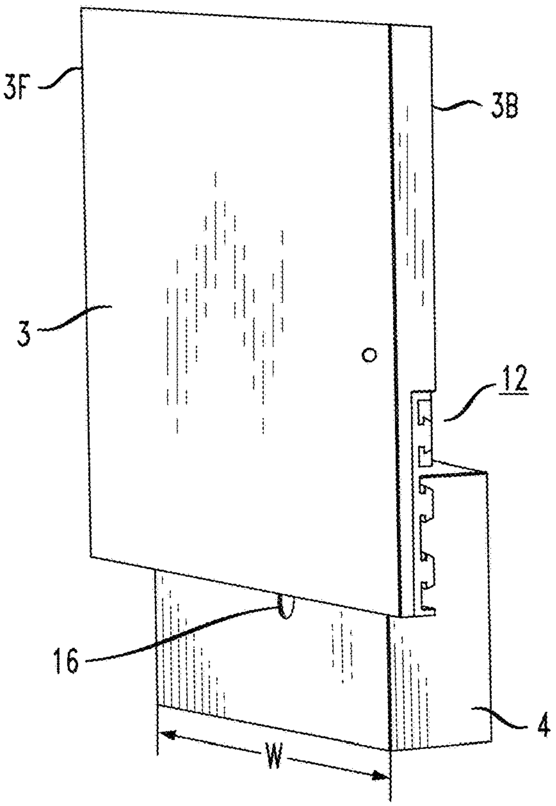
FIG. 3 is an isometric front view of the arrangement of FIG. 2, showing the position of the panel over the support member, while the releasable locking mechanism itself remains hidden behind the panel, a through-hole for controlling the movement of an included lever arm is formed in the support member and is visible immediately below the bottom edge of the panel.

FIG. 2 illustrates an exemplary releasable locking mechanism 10 formed in accordance with the present invention that is used to attach a panel 3 to a support member 4 (e.g., a 2×4) of support structure 2 in a releasable manner. It is to be understood that while the various features of the releasable locking mechanism are shown and described as associated with a "flat" panel location, the same type of mechanism may be used to releasably attach a "corner" type of covering in place as well. Thus, while the following description is with respect to a "panel 3", the term panel is presumed to broadly encompass both a flat panel and a rounded corner member. In accordance with the principles of the present invention, releasable locking mechanism 10 is itself hidden from view when panel 3 is place is attached to support member 4, as shown in the view of FIG. 3, which illustrates a front face 3F of panel 3 as positioned with respect to support member 4. Shown in this view is a through-hole 16 that is formed through the thickness of support member 4 at a particular location (as described below) and used to access and control the operation of releasable locking mechanism 10.

Referring back to FIG. 2, releasable locking mechanism 10 is shown as including a first component 12 that is formed on a back side 3B of panel 3, and is particularly positioned along a lower region 3L of back side 3B. Releasable locking mechanism 10 also includes a second component 14 that is attached to a top surface 4S of support member 4. As mentioned above with respect to FIG. 3 (and described in detail below), the disengagement of first component 12 from second component 14 is controlled by inserting a simple tool (wire, pencil, or the like) in through-hole 16. formed through the thickness of support member 4, initiating movement of second component 14 (not shown in FIG. 3) to release first component 12. This action results in easily disengaging panel 3 from support member 4, eliminating the need to use visible screws to hold the panel in place.

Figure 4:
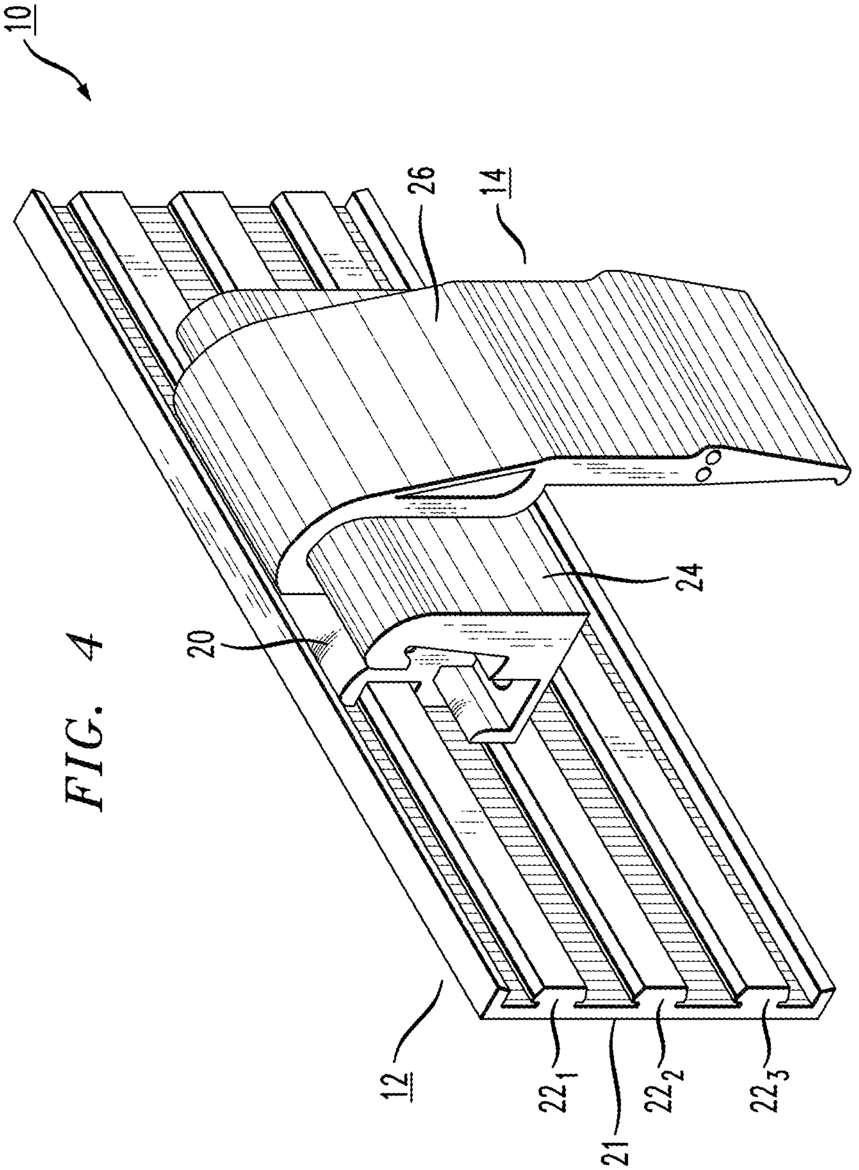
FIG. 4 is an isometric view of the releasable locking mechanism, the view being from a location behind the panel so as to illustrate the individual components of the mechanism.

FIG. 4 is an isometric view of releasable locking mechanism 10 (without showing either panel 3 or support member 4), illustrating the relationship between the elements of first component 12 and second component 14. In particular, first component 12 is shown as comprising an engagement tab 20 that is press-fit against a rib 22 of a plate 21, where plate 21 is attached to backside 3B of panel 3 in the manner shown above in FIG. 2. In the particular embodiment of releasable locking mechanism 10 shown in FIG. 4, plate 21 is formed to include a set of three separate ribs, $\mathbf{22}_1$, $\mathbf{22}_2$, and $\mathbf{22}_3$, disposed at different heights along plate 21. With the inclusion of multiple ribs, the user can then select the location that provides the appropriate positioning of the panel with respect to the support structure of the spa. It is to be understood that the use of the rib configuration is only one possible way to attach engagement tab 20 to backside 3B of panel 3; any other suitable arrangement may be used. For example, engagement tab 20 may be directly attached to backside 3B (although this configuration does not provide a means for adjusting the relative positioning of a panel with respect to a support post). Alternatively, a panel may itself be initially formed to include one or more engagement tabs on its rear surface.

Second component 14 is shown in FIG. 4 as comprising an elevation stand-off 24, with a tensioned lever arm 26 positioned over stand-off 24 in the manner better shown in FIG. 2 (an elastic member 40 may be used to provide the retentive force for holding lever arm 26 in position with respect to stand-off 24). In use, stand-off 24 is attached to top surface 4S of a support member (as also shown in FIG. 2) and is fixed in place. The action of inserting a tool into aperture 16 (as discussed above in association with FIG. 3) is used to control the movement of tensioned lever arm 26 with respect to stand-off 24 and engagement tab 20, thus providing disengagement of panel 3 from support member 4 in accordance with the principles of the present invention. Re-attaching panel 3 to support member 4 requires merely repositioning engagement tab 20 with respect to stand-off 24 and lowering tab 20 so as to again "lock" in place.

Figure 5:
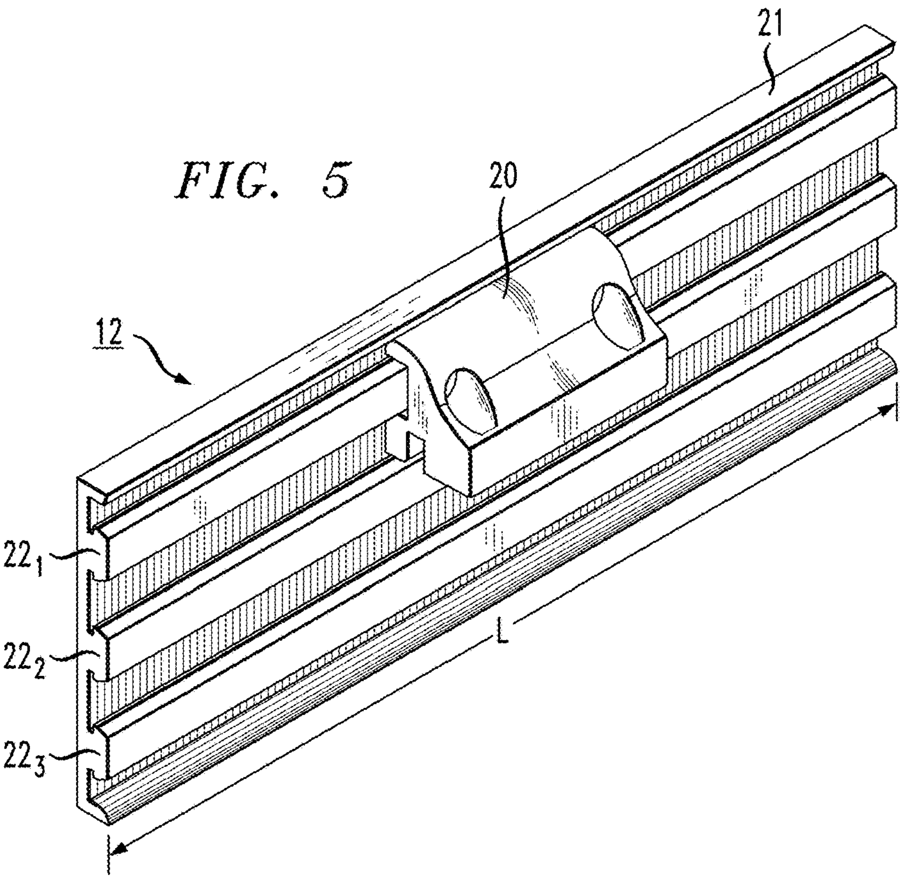
FIG. 5 is an isometric view of the first component of the releasable locking mechanism, the first component being the element attached to the rear surface of the panel.
Figure 6:
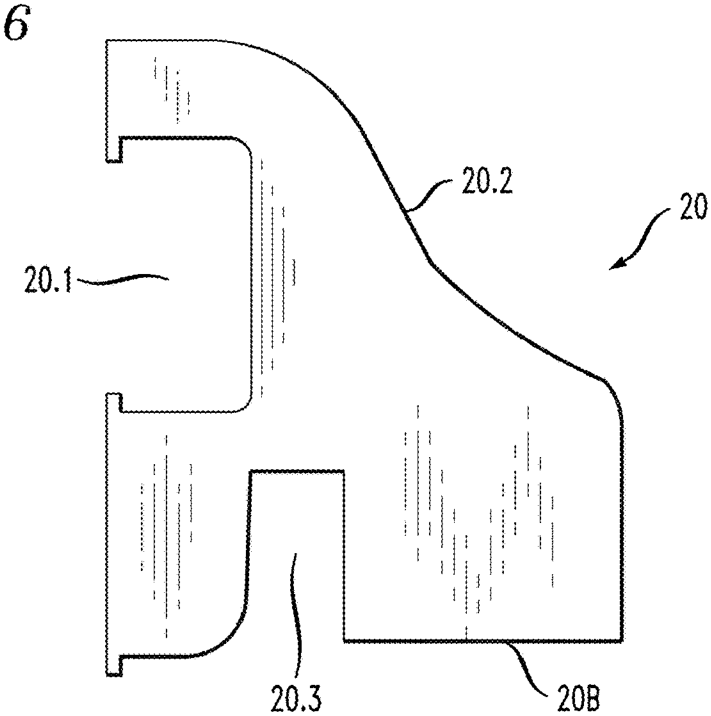
FIG. 6 is a side view of the engagement tab portion of the first component as shown in FIG. 5.

FIG. 5 is an isometric view of first component 12, which clearly shows one particular configuration of engagement tab 20. FIG. 6 is a side view of engagement tab 20. Referring to both FIGS. 5 and 6, engagement tab 20 is shown as including a C-channel portion 20.1 that engages with a selected rib 22. Preferably, the engagement is of a press-fit nature that allows for the attachment to remain secure, but with the ability to remove engagement tab 20 when necessary to re-locate its position along a different rib 22. The length L of plate 21 is a matter of design choice, and in some embodiments may extend across the entire width of a panel 3. Alternatively, plate 21 may be sized to match the width W of an exemplary support member 4. Indeed, the various elements of the inventive releasable locking mechanism may have any dimensions that are suitable for the particular use of the mechanism and are not considered to be germane to the principles of the invention itself.

As best shown in FIG. 6, engagement tab 20 includes a sloped outer surface 20.2 that works with lever arm 26 in a manner described below to control the releasable engagement between first component 12 and second component 14. In this particular embodiment, engagement tab 20 also includes a lower channel 20.3 that sits over a lip formed in stand-off 24 (illustrated in FIG. 4 and described below) to help secure first component 12 to second component 14.

Figure 7:
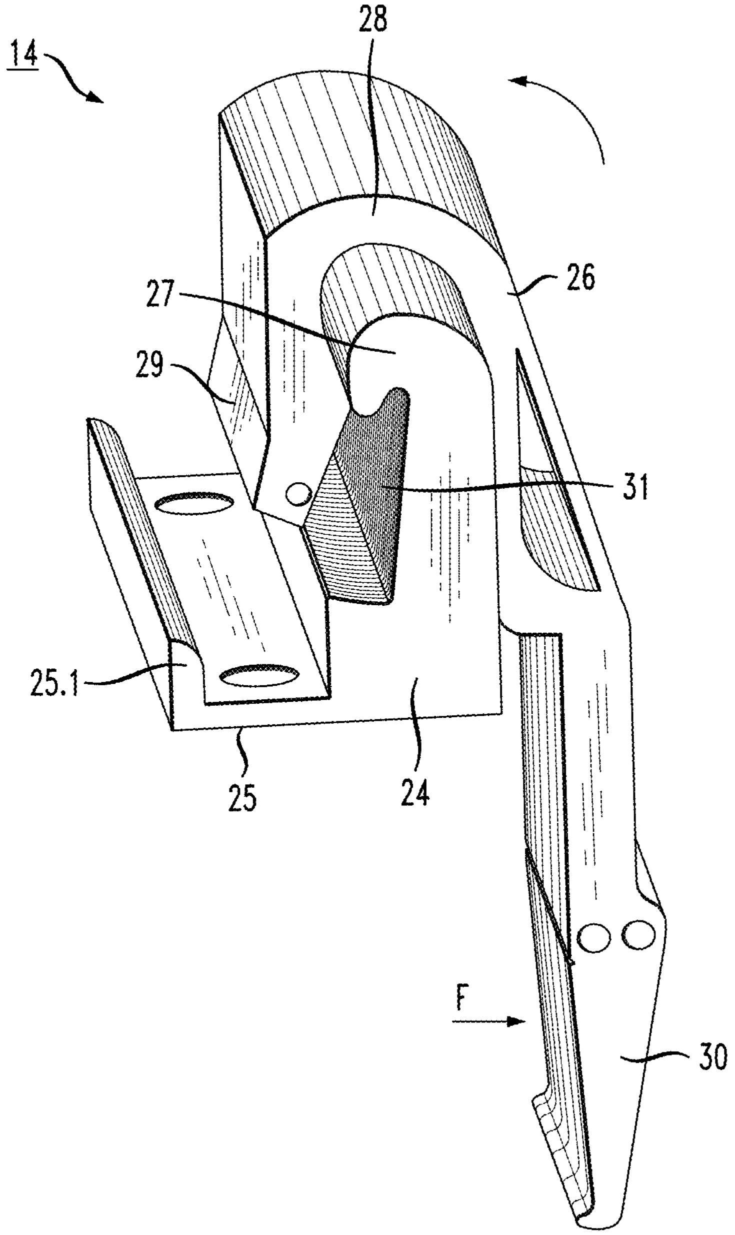
FIG. 7 is an isometric view of the second component of the releasable locking mechanism, the second component being the element attached to the top of the support member and including an elevation stand-off and lever arm.

FIG. 7 is an isometric, exploded view of second component 14 that clearly illustrates the form of stand-off 24 and tensioned lever arm 26, showing how they work together to effect the releasable locking feature of the present invention. Stand-off 24 is shown as including a channel 25 that is sized to accommodate a bottom surface 20B of engagement tab 20, as will be shown in the following drawings. An outer lip 25.1 of channel 25 is sized and positioned to mate with lower channel 20.3 of engagement tab 20 (see FIG. 6) when first component 12 and second component 14 are releasably jointed together. An upper portion 27 of stand-off 24 is rounded and used as a pivot point for lever arm 26 (upper portion 27 hereinafter referred to as "pivot point 27").

A rounded upper portion 28 of lever arm 26 is configured to fit over pivot point 27, which allows for rotation of lever arm 26 with respect to stand-off 24. As the rotation occurs, a locking edge 29 of lever arm 26 rotates into a recess 31 formed in stand-off 24. Once locking edge 29 has entered recess 31, engagement tab 20 is free to be lifted out of stand-off 24 and thus dis-engage panel 3 from support structure 4. Lever arm 26 is further configured to include a lower tail 30, which functions to rotate lever arm 26 about pivot point 27 upon the application of a force F to tail 30. Elastic member 40 is used to create the elastic force that controls the movement of lever arm 26 with respect to stand-off 24 in a manner that will be evident in the following discussion.

Figure 8:
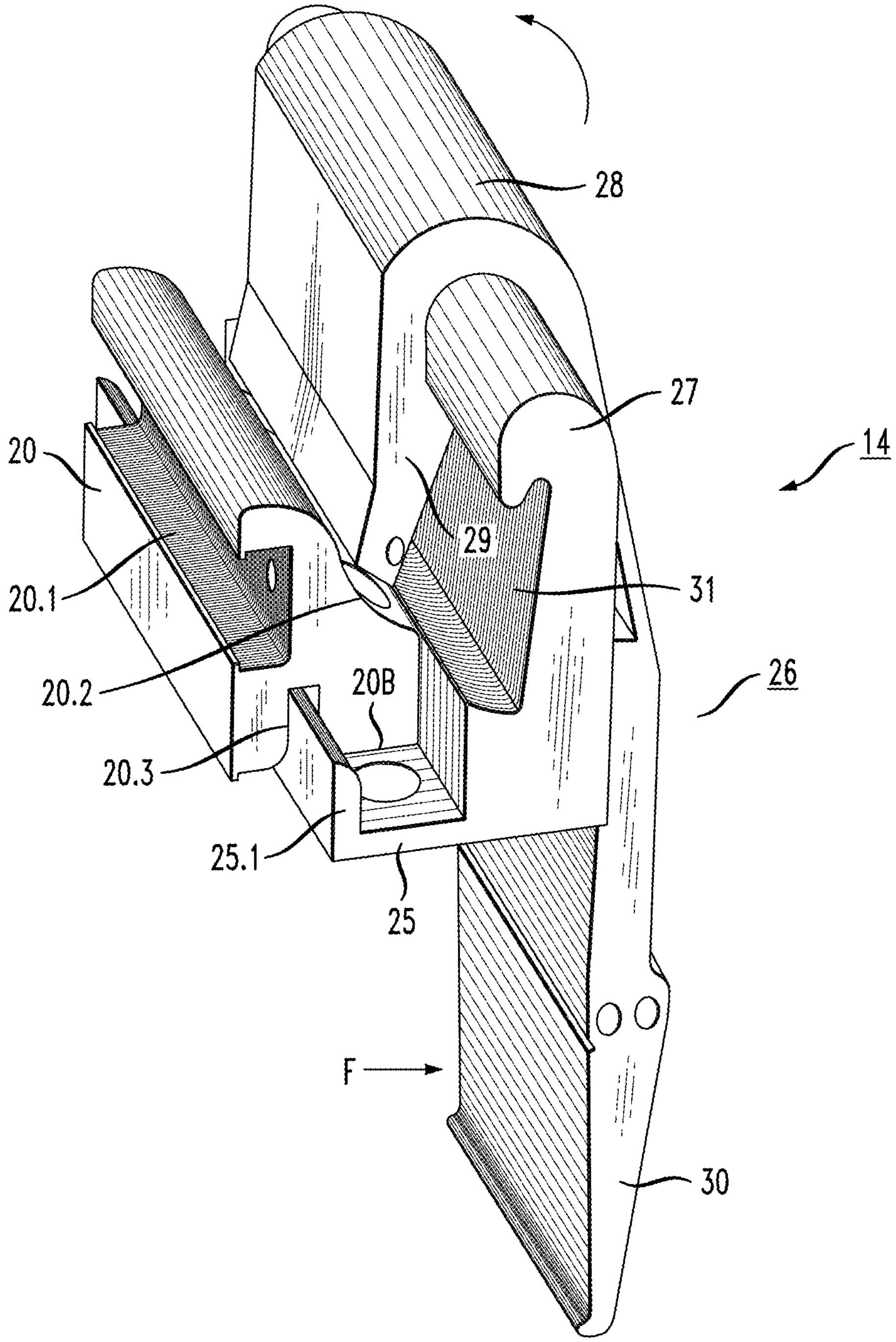
FIG. 8 is an isometric view showing the positional relationship of the engagement tab of the first component with the stand-off of the second component.
Figure 9:
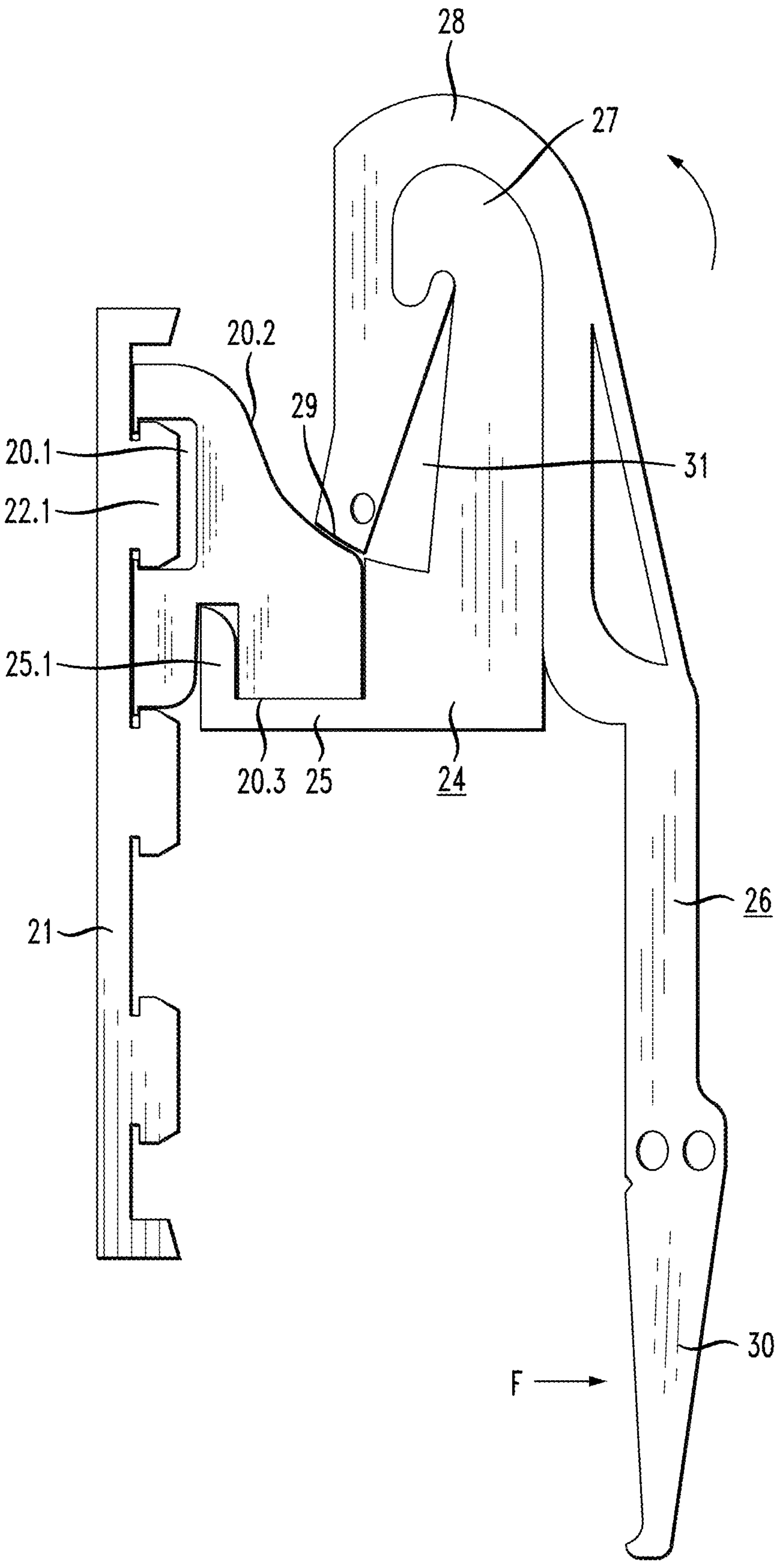
FIG. 9 is a cut-away side view of the releasable locking mechanism of the present invention, in this case in the "locked" position with the first component held in place within the second component.

FIG. 8 is an isometric view showing the positioning of engagement tab 20 within second component 14 when first component 12 is releasably attached to second component 14 (i.e., when panel 3 is positioned in place over support member 4. Clearly evident in this view is the positioning of engagement tab 20 within channel 25 of stand-off 24. Also shown here is the region of contact between locking edge 29 of lever arm 26 and sloped outer surface 20.2 of engagement tab 20. The tension provided by elastic member 40 ensures that locking edge 29 remains in this position as long as engagement tab 20 is located in channel 25. FIG. 9 is a cut-away side view of releasable locking mechanism 10 which also illustrates the positioning of locking edge 29 over sloped outer surface 20.2 of engagement tab 20. Recess 31 is clearly shown as sized to capture locking edge 29 when rotated away from its engagement with sloped outer surface 20.2. Also shown in this side view is plate 21 of first component 12. In this particular illustration, engagement tab 20 is shown as being press-fit along a top rib $\mathbf{22}_1$ of plate 21. The illustration of FIG. 9 shows releasable locking mechanism 10 in its "locked" position with first component 12 held in place within second component 14.

Figure 10:
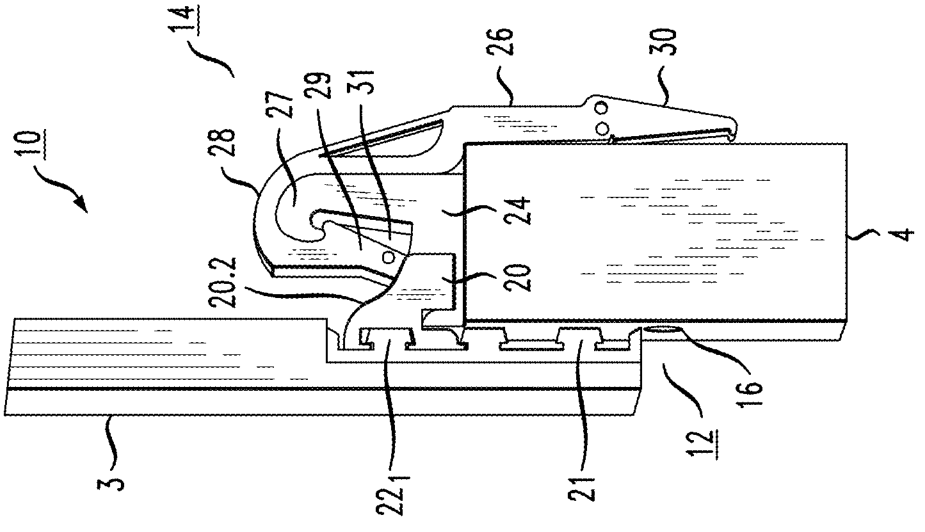

FIGS. 10-14 illustrate the working of releasable locking mechanism 10 to allow for the quick release of panel 3 from support member 4, when necessary. Similar to the side view of FIG. 9, the isometric view of FIG. 10 shows releasable mechanism 10 in the "locked" position, with locking edge 29 of tensioned lever arm 26 shown in position over sloped outer portion 20.2 of engagement tab 20, holding engagement tab 20 in place within stand-off 24.

Figure 11:
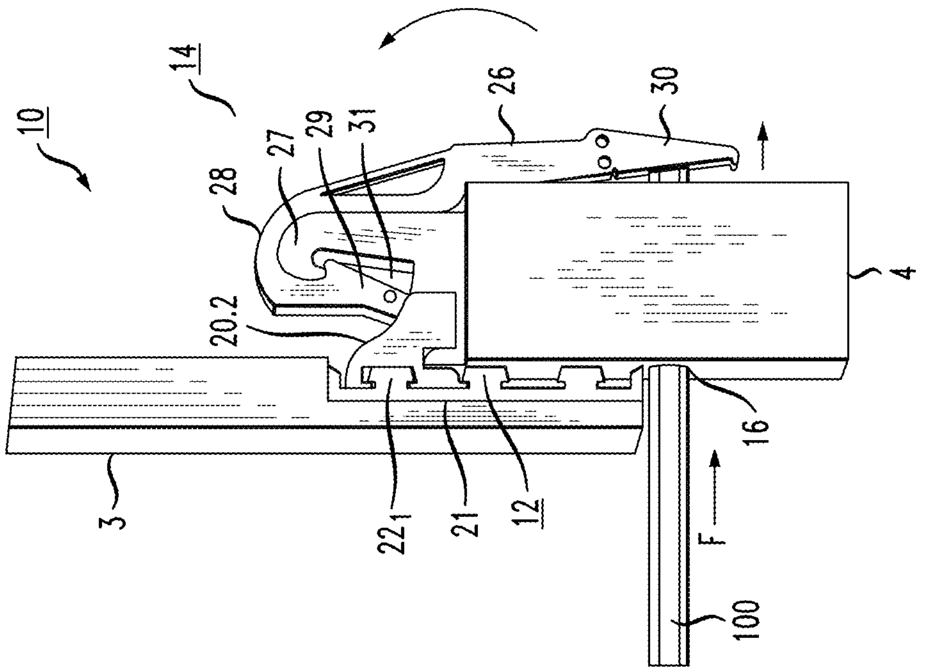
FIGS. 10-14 illustrate the steps involved in using the inventive releasable locking mechanism to remove a panel from a support member, where in particular.
Figure 12:
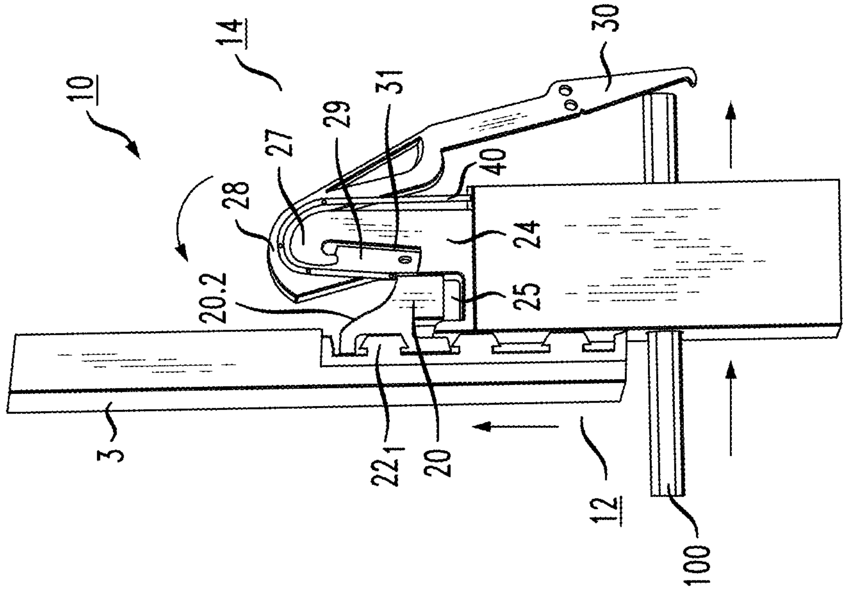

FIG. 11 illustrates a first step in the process of releasing panel 3 from support member 4, which utilizes a simple tool 100 (illustrated here as a pencil) that is inserted into through-hole 16 formed in support member 4 (FIG. 3 clearly shows through-hole 16). Tool 100 is shown as passing through the thickness of support member 4 and contacting tail 30 of lever arm 26. As tool 100 is continued to move rearward, it pushes tail 30 backward, as shown by the arrows in FIG. 12. Simultaneously, the movement of tail region 30 causes the rotation of upper portion 28 of lever arm 26 about pivot point 27 of stand-off 24. In particular, and as shown in FIG. 12, the rotation of lever arm 26 results in locking edge 29 moving away from sloped surface 20.2 of engagement tab 20 and entering recess 31 formed in elevation stand-off 24. Recess 31 is formed to have a depth sufficient to accept the full width of locking edge 29, providing clearance for the movement of engagement tab 20 upwards and away from channel 25 of stand-off 24. Said another way, the rotational movement of tensioned lever arm 26, as controlled by an individual using a simple tool 100, releases first component 12 of locking mechanism 10 from second component 14.

Figure 13:
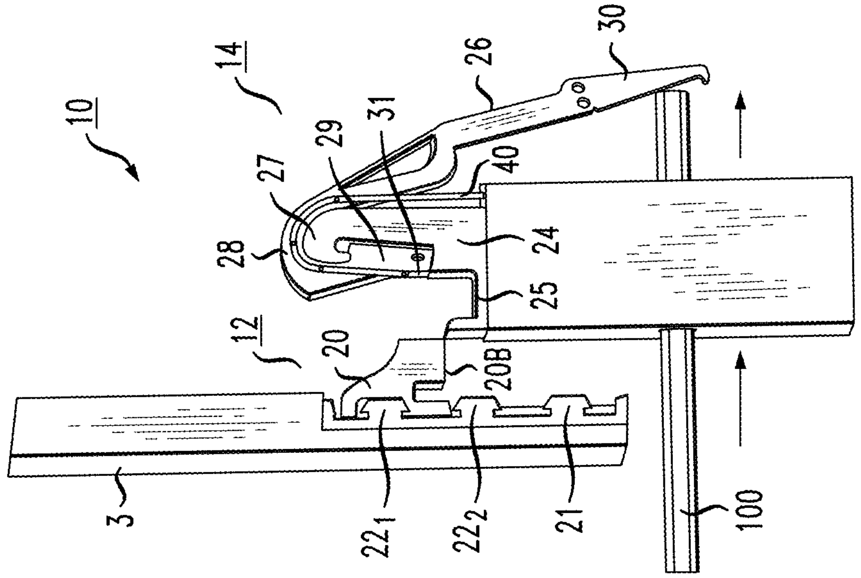
Figure 14:
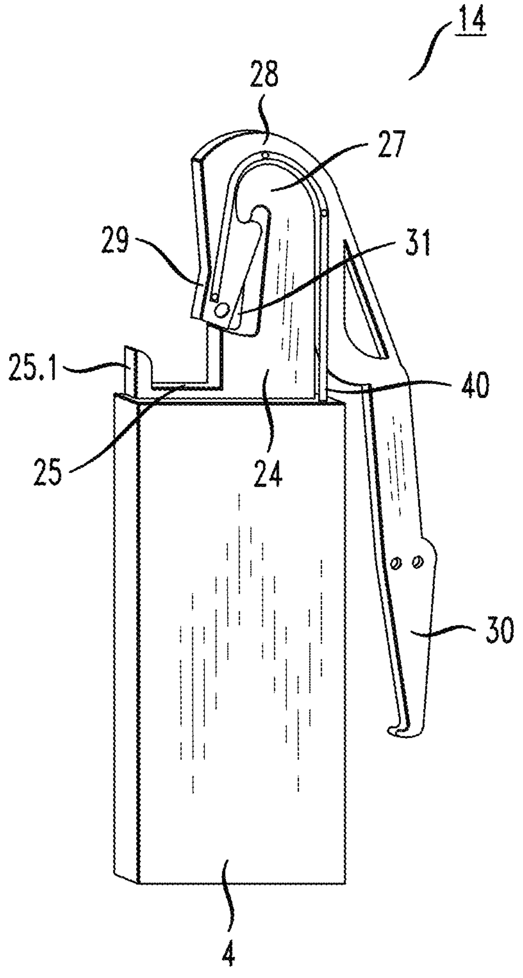

FIG. 13 illustrates the complete removal of engagement tab 20 from channel 25 of stand-off 24, allowing for an individual to then simply lift up panel 3 (as indicated by the arrow in FIG. 13) to remove panel 3 from support member 4. As mentioned above, lever arm 26 is tensioned in configuration, such as with elastic member 40, to ensure that locking edge 29 applies a sufficient force to hold engagement tab 20 in place, as well as to allow lever arm 26 to return to its "rest" position once first component 12 is released from second component 14. FIG. 14 shows this dis-engaged (rest) configuration of second component 14. Once repairs are completed and it is desired to re-attach panel 3, the individual is able to simply lower the panel to position engagement tab within channel 25 of stand-off 24 once again.

It is to be understood that the principles of the invention as described above may assume various alternative applications, and the releasable locking mechanism should not be considered as limited to applications for removing decorative panels from a structural support of a spa tub, but more generally to any type of building structure where vertical panels need to be removably attached to a frame. Although the invention has been described in detail for the purposes of illustration based on what is currently considered to be the most practical and preferred embodiments or aspects, it is to be understood that such detail is solely for that purpose and the invention, as a whole, is not so limited.

Those skilled in the art will appreciate that various adaptations and modifications of the described embodiments can be configured without departing from the spirit and scope of the invention as defined by the claims appended hereto.

What is claimed is:

1. A releasable locking mechanism for holding a vertical panel in place along a structural framing member comprising:

- a first component including an engagement tab, the first component configured to be affixed to a rear surface of the vertical panel; and
- a second component configured to be attached to a top surface of the structural framing member, the second component including a tensioned lever arm comprising a rounded upper portion including a locking edge for positioning over the engagement tab and an opposing, lower tail portion, wherein translational movement of the lower tail portion imparts a rotational movement of the locking edge including in the rounded upper portion to control the position of the locking edge with respect to the engagement tab and thereby control the engagement and disengagement of the first component with respect to the second component.

2. The releasable locking mechanism as defined in claim 1, wherein the first component further comprises a plate configured to be affixed to the rear surface of the vertical panel, the plate including a plurality of spaced-apart attachment locations for mating with the engagement tab.

3. The releasable locking mechanism as defined in claim 2 wherein the plurality of spaced-apart channel locations comprise a plurality of ribs, and the engagement tab includes a channel element for mating with a selected rib.

4. The releasable locking mechanism as defined in claim 1 wherein the engagement tab is configured to be directly affixed to the rear surface of the vertical panel.

5. The releasable locking mechanism as defined in claim 1 wherein the second component further comprises an elevation stand-off element for attachment to a top surface of a support member, the elevation stand-off element including a pivot point for mating with the lever arm and a channel for supporting the engagement tab in a position where the rotation of the lever arm positions the locking edge over the engagement tab.

6. The releasable locking mechanism as defined in claim 5 wherein the stand-off element further comprises a recessed area for capturing the locking edge of the lever arm when rotated out of position over the engagement tab.

7. The releasable locking mechanism as defined in claim 1, wherein the second component further comprises an elastic member disposed over the lever arm to provide a tension force for holding the engagement tab in place.

* * * * *